United States Patent
Kischkat

(10) Patent No.: US 9,328,609 B2
(45) Date of Patent: May 3, 2016

(54) APPARATUS AND METHOD FOR DETERMINATION OF FORMATION BUBBLE POINT IN DOWNHOLE TOOL

(71) Applicant: Tobias Kischkat, Celle (DE)

(72) Inventor: Tobias Kischkat, Celle (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 813 days.

(21) Appl. No.: 13/666,282

(22) Filed: Nov. 1, 2012

(65) Prior Publication Data

US 2014/0121976 A1    May 1, 2014

(51) Int. Cl.
G06F 17/40    (2006.01)
G06F 19/00    (2011.01)
E21B 49/08    (2006.01)

(52) U.S. Cl.
CPC .............. *E21B 49/082* (2013.01); *E21B 49/08* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | | | |
|---|---|---|---|---|---|
| 3,369,395 | A | * | 2/1968 | Scott | E21B 47/06 73/152.53 |
| 4,589,485 | A | * | 5/1986 | Wray | E21B 33/124 166/142 |
| 4,595,060 | A | * | 6/1986 | Beck | E21B 34/108 166/321 |
| 4,617,999 | A | * | 10/1986 | Beck | E21B 34/108 166/321 |
| 4,665,991 | A | * | 5/1987 | Manke | E21B 34/108 166/321 |
| 6,334,489 | B1 | | 1/2002 | Shwe et al. | |
| 7,197,398 | B2 | * | 3/2007 | Azari | E21B 49/08 702/13 |
| 7,216,533 | B2 | | 5/2007 | McGregor et al. | |
| 7,234,521 | B2 | | 6/2007 | Shammai et al. | |
| 7,346,460 | B2 | | 3/2008 | DiFoggio et al. | |
| 7,665,354 | B2 | | 2/2010 | Shammai | |
| 8,256,283 | B2 | | 9/2012 | Terabayashi et al. | |
| 2006/0212223 | A1 | * | 9/2006 | Azari | E21B 49/08 702/6 |
| 2009/0187346 | A1 | | 7/2009 | Li | |
| 2010/0313647 | A1 | | 12/2010 | Terabayashi et al. | |
| 2011/0218736 | A1 | | 9/2011 | Pelletier | |
| 2012/0018152 | A1 | | 1/2012 | Zuilekom et al. | |

OTHER PUBLICATIONS

Fluids Sampling and Analysis, EXPRO, Well Testing and Commissioning. exprogroupo.com. Well Flow Management. 4 pages.
Notification of Transmittal of the International Search Report and the Written Opinion of the International Searching Authority, or the Declaration; PCT/US2013/067250; Mailed Feb. 17, 2014, 10 pages.

* cited by examiner

*Primary Examiner* — Edward Cosimano
(74) *Attorney, Agent, or Firm* — Cantor Colburn LLP

(57) ABSTRACT

An apparatus for estimating a bubble point of a fluid in an earth formation penetrated by a borehole includes: a pump configured to pump fluid from the earth formation through an extendable probe into a volume; and a processor. The processor is configured to perform a pressure-volume test on the fluid sample. The test includes: increasing the pressure of the fluid sample above formation pressure and logging the pressure and volume of the fluid sample; calculating a reference compressibility of the fluid sample; decreasing the pressure of the fluid sample and logging the pressure and volume; calculating a compressibility of the fluid sample using the logged pressure and volume obtained from during the decreasing; comparing the calculated compressibility to a threshold; and estimating the bubble point as the current fluid sample pressure when the calculated compressibility first meets or exceeds the threshold factor.

24 Claims, 6 Drawing Sheets

APPARATUS AND METHOD FOR DETERMINATION OF FORMATION BUBBLE POINT IN DOWNHOLE TOOL

BACKGROUND

A borehole is generally drilled into an earth formation in order to extract hydrocarbons from a reservoir. The hydrocarbons may be in the form of oil and/or gas. The hydrocarbons are produced by lowering the pressure in the borehole so that the hydrocarbons, which are under higher pressure, flow into the borehole and to the surface of the earth.

If the hydrocarbons in the formation are in the form of oil and gas, it is important to know the bubble pressure of the oil. The bubble pressure relates to the highest pressure at which a chemical constituent in a liquid turns to vapor and forms bubbles. Thus, if only oil is desired to be extracted and the pressure in the borehole is lowered below the bubble point, mostly or only gas will flow out because the hydrocarbon gas has a lower viscosity than oil. Hence, in order to extract oil, it is important to extract the oil at a pressure above the bubble point. Keeping the pressure in the borehole above the bubble point but close to the bubble point will improve the rate of production since the lower the pressure the higher the rate of oil production will be. Therefore, it would be well received in the drilling industry if a downhole tool were available to accurately measure the bubble pressure of oil.

BRIEF SUMMARY

Disclosed is an apparatus for estimating a bubble point of a fluid in an earth formation penetrated by a borehole. The apparatus includes: a carrier configured to be conveyed through the borehole; a probe disposed at the carrier and configured to extend from the carrier and seal to a wall of the borehole; a pump in fluid communication with the probe, the pump having a variable volume configured to pump fluid from the earth formation into the volume within the pump; a volume sensor configured to sense the volume within the pump; a pressure sensor in pressure communication with the fluid in the volume of the pump and configured to sense the pressure of the fluid in the volume in the pump; an isolation valve coupled to the probe and configured to isolate a sample of the fluid pumped through the probe; and a processor coupled to the volume sensor, the pressure sensor, and a prime mover configured to operate the pump to change the variable volume. The processor is configured to perform a pressure-volume test on the fluid sample. The test includes: increasing the pressure of the fluid sample above formation pressure by decreasing the volume within the pump and logging the pressure and volume of the fluid sample using the pressure sensor and the volume sensor during the decrease in volume of the pump; calculating a reference compressibility of the fluid sample; decreasing the pressure of the fluid sample and logging the pressure and volume using the pressure sensor and the volume sensor; calculating a compressibility of the fluid sample using the logged pressure and volume obtained from during the decreasing; comparing the calculated compressibility to a threshold; and estimating the bubble point as the current fluid sample pressure when the calculated compressibility first meets or exceeds the threshold factor.

Also disclosed is a method for estimating a bubble point of a fluid in an earth formation penetrated by a borehole. The method includes: conveying a carrier through the borehole; extracting a sample of fluid from the formation using a probe extending from the carrier to the formation; closing an isolation valve in fluid communication with the probe in order to isolate the fluid sample from the formation; increasing the pressure of the fluid sample above formation pressure by decreasing a volume within a pump in fluid communication with the probe and logging the pressure and volume of the fluid sample using a pressure sensor and a volume sensor during the decreasing of the volume within the pump; calculating a reference compressibility of the fluid sample using a processor; decreasing the pressure of the fluid sample by increasing the volume within the pump and logging the pressure and volume measured by the pressure sensor and the volume sensor; calculating a compressibility of the fluid sample using the logged pressure and volume obtained from during the decreasing, the calculating being performed by the processor; comparing the calculated compressibility to a threshold using the processor; and estimating the bubble point as the current fluid sample pressure when the calculated compressibility first meets or exceeds the threshold.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Disclosed are method and apparatus for estimating or determining a bubble point of a liquid disposed in an earth formation by performing a pressure-volume test. In general, as related to oil production, the bubble point is only applicable to volatile or non-volatile oil.

Figure 1:
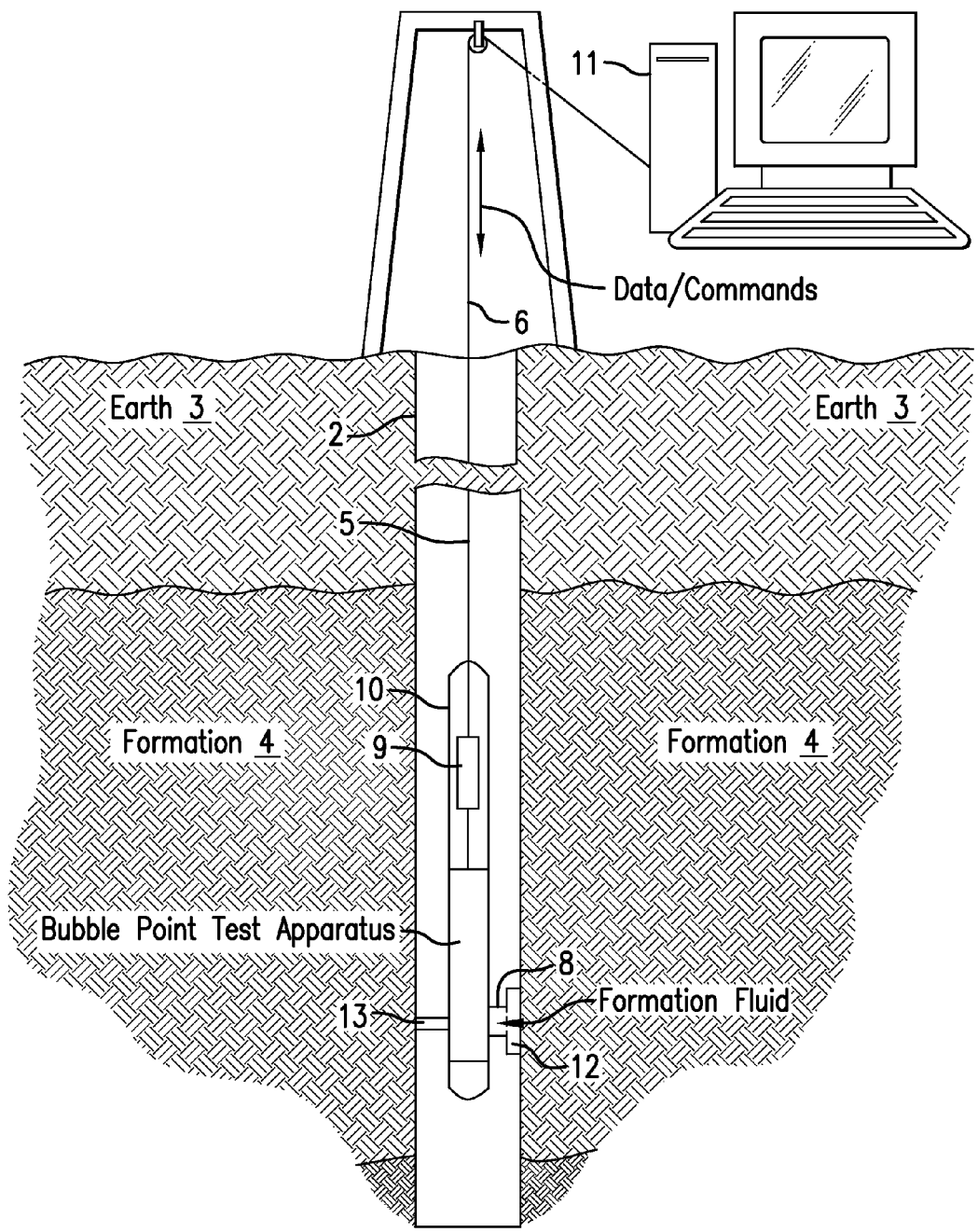
FIG. 1 illustrates an exemplary embodiment of a downhole tool for measuring bubble pressure disposed in a borehole penetrating the earth.

FIG. 1 illustrates a cross-sectional view of an exemplary embodiment of a downhole tool 10 disposed in a borehole 2 penetrating the earth 3, which includes an earth formation 4. The formation 4 represents any subsurface material of interest such as formation fluid. The downhole tool 10 is conveyed through the borehole 2 by a carrier 5. In the embodiment of FIG. 1, the carrier 5 is an armored wireline 6. Besides supporting the downhole tool 10 in the borehole 2, the wireline can also provide communications between the downhole tool and a computer processing system 11 disposed at the surface of the earth 3. Communications can include sending measurement data uphole to the computer processing system 11 or commands downhole to the tool 10. In logging-while-drilling (LWD) or measurement-while-drilling (MWD) embodiments, the carrier 5 can be a drill tubular such as a drill string. In order to operate the downhole tool 10, process measurement data, and/or provide a communications interface with the surface computer processing system 11, the downhole tool 10 includes downhole electronics 9. The operating and processing functions of the disclosure may be performed by the downhole electronics 9, the computer processing system 11, or a combination thereof.

Still referring to FIG. 1, the downhole tool 10 is configured to perform a measurement of the bubble point of a fluid (i.e., formation fluid) extracted from the formation 4. In order to extract the formation fluid, the downhole tool 10 includes a probe 8 configured to extend from the tool 10 and seal to a wall of the borehole 2. The probe 8 may include a pliable pad 12 to provide sealing to an uneven surface of the borehole wall. An extendable brace 13 may be included to hold or brace the probe 8 against the borehole wall while the fluid is being extracted from the formation 4.

Figure 2:
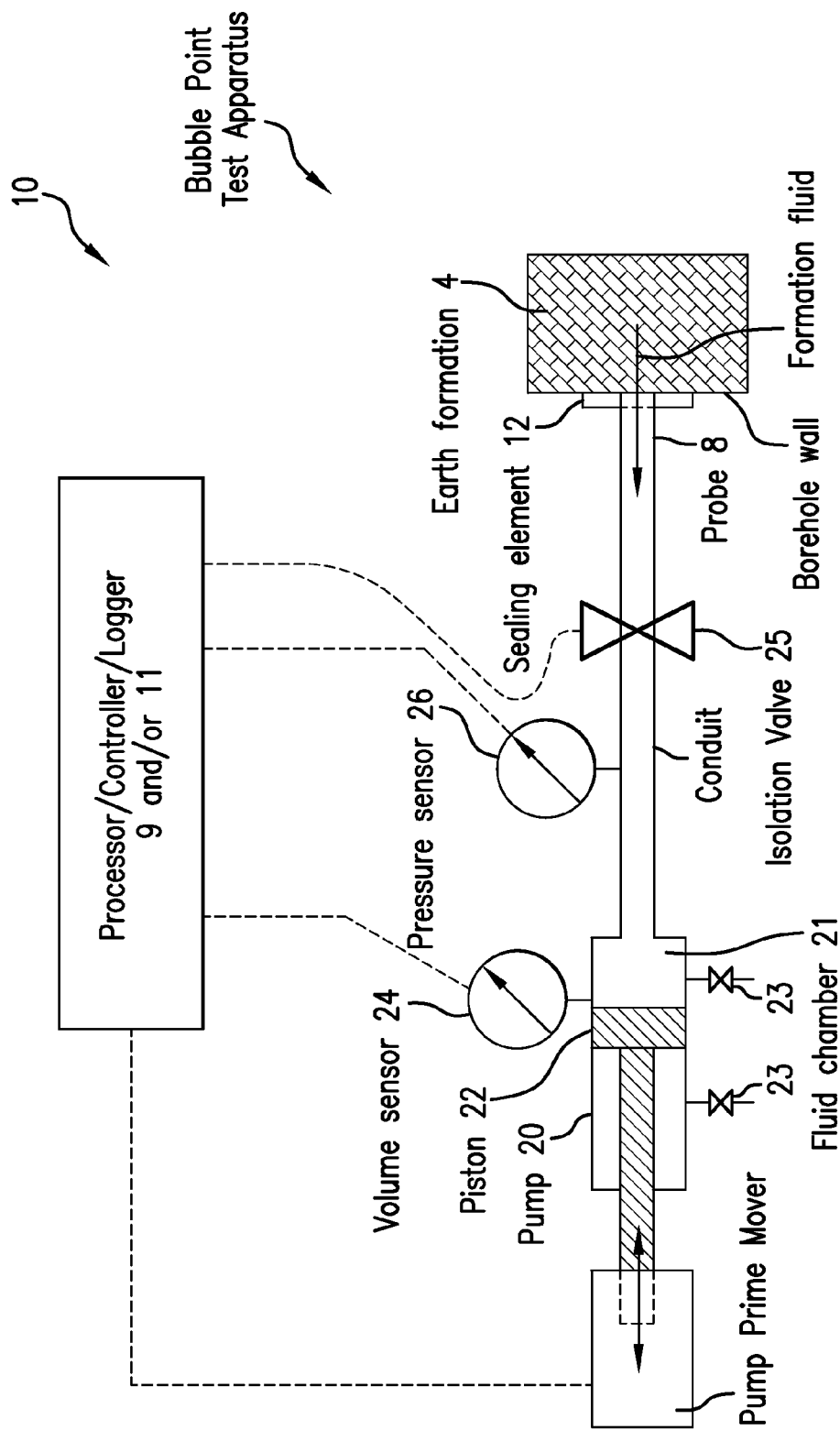
FIG. 2 depicts aspects of the downhole tool.

FIG. 2 is a cross-sectional view depicting aspects of the downhole tool 10 in further detail. The downhole tool 10 includes a positive displacement pump 20, which is configured to receive formation fluid extracted via the probe 8. The pump 20 includes a fluid chamber 21 and a piston 22, which is configured to traverse the fluid chamber 21 to pump fluid. The pump 20 also includes remotely-isolatable discharge valves 23, which may be used to flush the pump of borehole fluid or mud infiltrate. A volume sensor 24 is configured to measure a volume in the fluid chamber 21 with the piston 22 forming one boundary of the fluid chamber 21 as shown in FIG. 2. The volume sensor 24 provides a measurement of the volume throughout the sequence of the pressure-volume test. In one or more embodiments, the volume sensor 24 is configured to measure the position of the piston 22, such as magnetically for example, in order to measure the volume of the fluid chamber 21 based on piston position. A remotely-operated isolation valve 25 is disposed in a conduit leading from the probe 8 to the fluid chamber 21. The isolation valve 25 is configured to isolate a volume that may be varied by varying the position of the pump piston 22. Hence, the volume sensed by the volume sensor 24 may include the volume of the conduit between the pump 20 and the isolation valve 25. It can be appreciated that the pressure of the fluid sample within the isolated volume may be increased by decreasing the volume of the fluid chamber 21 (for example by moving the piston 22) and, conversely, the pressure of the fluid sample may be decreased by increasing the volume of the fluid chamber 21. A pressure sensor 26 is in pressure communication with the isolated volume and is configured to sense the pressure of the fluid in the isolated volume. The volume sensor 24 and the pressure sensor 26 are configured to send measurement information to the downhole electronics 9 and/or the computer processing system 11. The pump 20, the remotely-operated discharge valves 23, and the remotely-operated isolation valve 25 are configured to receive commands from the downhole electronics 9 and/or the computer processing system 11 for operating the downhole tool 10 in accordance with the disclosure herein.

Figure 3:
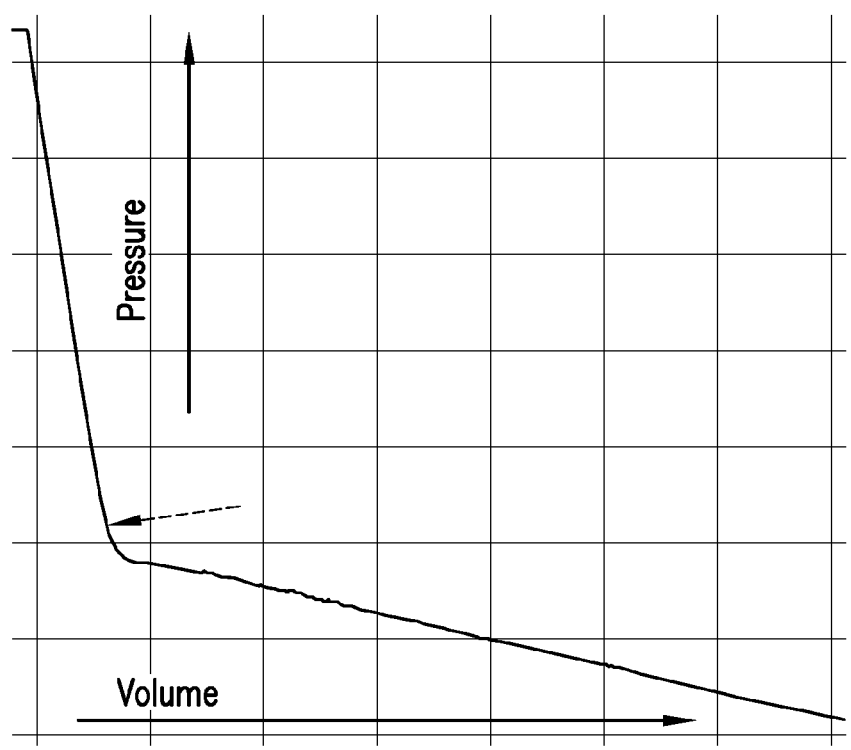
FIG. 3 illustrates one example of response curve for a pressure-volume test.

FIG. 3 illustrates one example of a response curve for a pressure-volume test. The dashed arrow indicates a change of the shape of the curve during the test. This change happens when the pressure is low enough for a fluid component to change into a gaseous state. The fluid thus changes from single-phase to multi-phase. The bubble point is defined as the pressure at which the first gas bubbles appear. In one or more embodiments, the bubble point is determined where the magnitude of the negative slope on the left part of the curve first starts to decrease (i.e., curve from the straight line). It is noted that the bubble point cannot be measured if the fluid is already in a gaseous state or supercritical state (i.e., condensate, wet gas or dry gas). A fluid in such a state does not show a bubble point when it is being expanded, but it might reach a dew point when the pressure is decreased. The bubble point might not also be measured if the bubble point is too low for the pump to reach (i.e., if the pump stalls at its rated maximum differential pressure before the bubble point is reached).

Figure 4:
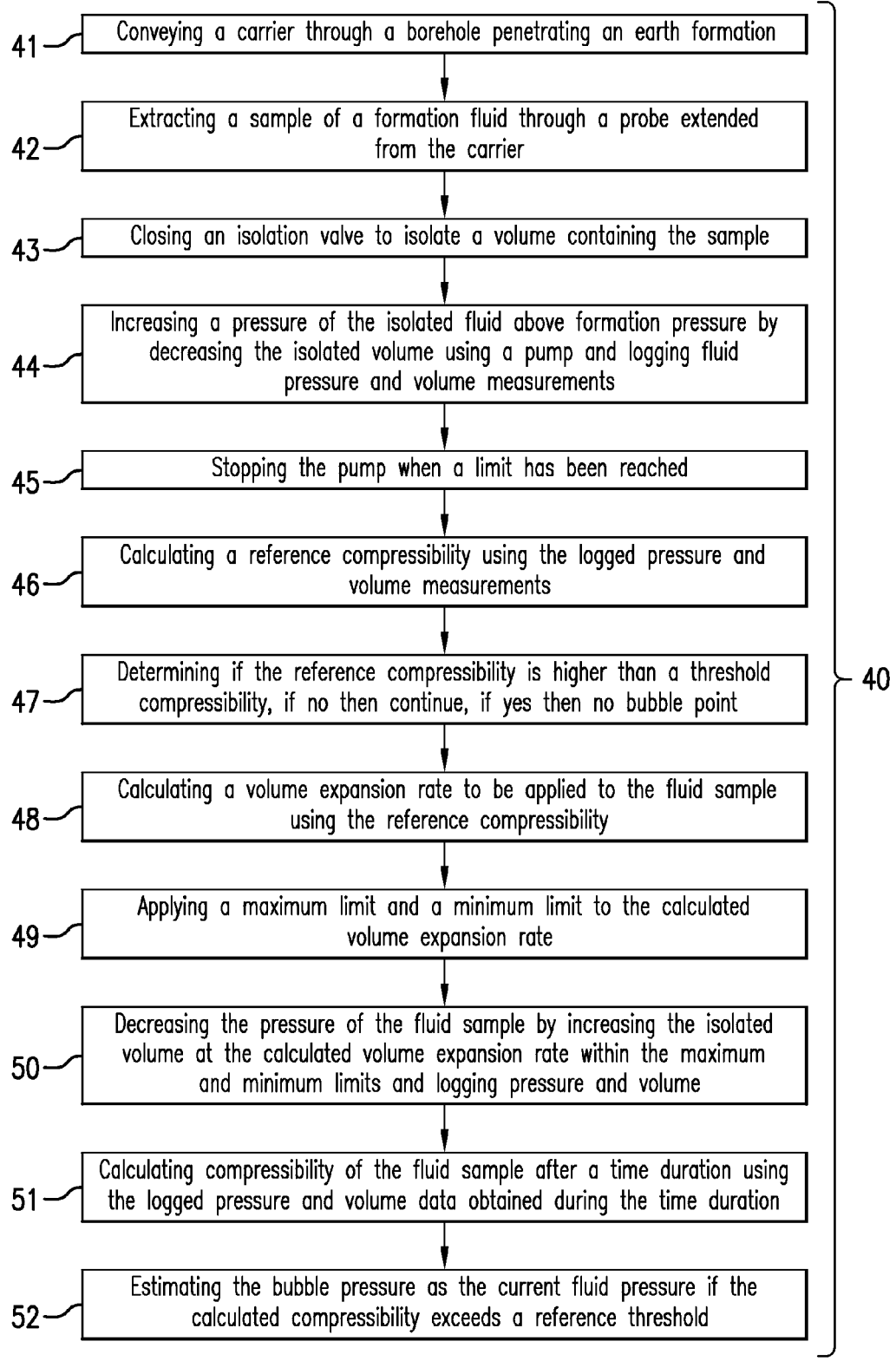
FIG. 4 is a flow chart for a method for estimating a bubble point of a liquid in an earth formation.

FIG. 4 is a flow chart for a method 40 for estimating a bubble point of a fluid in an earth formation. Block 41 calls for conveying a carrier through a borehole penetrating the earth formation. Block 42 calls for extracting a sample of the fluid through a probe extended from the carrier. Block 43 calls for closing an isolation valve to isolate a volume containing the sample. Block 44 calls for increasing a pressure of the isolated fluid above formation pressure by decreasing the isolated volume using a pump. The formation pressure may be determined by the pressure sensor after the sample is extracted, but before the isolation valve is closed (i.e., with the sample pressure in equilibrium with the formation pressure). A piston in the pump may be moved at a predetermined speed to decrease the volume while pressure and volume are logged (i.e., recorded). Block 45 calls for stopping the pump when a limit has been reached (e.g., pressure limit above formation pressure, a percentage above formation pressure, volume limit of the pump, time limit for decreasing the volume, or maximum differential rating of the pump). In one or more embodiments, the pump is stopped when the sample pressure is 20 bar above the formation pressure. Block 46 calls for calculating fluid compressibility using the logged pressure and volume data. The calculated compressibility is used as a reference compressibility. Compressibility is defined as $$\beta = -\frac{1}{V}\frac{\partial V}{\partial p}$$

where V represents fluid volume and p represents fluid pressure.

In one or more embodiments, the partial differential is determined in an isothermal process (i.e., at constant temperature). Accordingly, in Block 44 the pressure can be increased slowly so that the compression is an isothermal process.

Block 47 calls for determining if the reference compressibility is higher than a threshold compressibility. If the reference compressibility is higher than the threshold, then the bubble point cannot be determined because there is already gas in the fluid. If the reference compressibility is less than or equal to the threshold, then proceed with determining the bubble point.

Block 48 calls for calculating a volume expansion rate (i.e., change in volume over time) for a pressure-volume (P-V) test. In one or more embodiments, the volume expansion rate is the pump rate for pumping. The volume expansion rate in combination with the reference compressibility leads to a pressure decrease rate, assuming constant compressibility of the fluid. Block 49 calls for applying a maximum limit and a minimum limit to the calculated volume expansion rate. Different factors, such as equipment ratings and time constraints, may dictate these limits. For example, the minimum limit might be determined by the minimum speed of the pump or time available for conducting the P-V test. The maximum limit might be determined by available pump stroke, time available for conducting the P-V test, or maximum possible pump differential pressure.

Block 50 calls for decreasing the pressure of the fluid sample by increasing the isolated volume at the calculated volume expansion rate and logging pressure and volume during this P-V test. Block 51 calls for calculating compressibility of the fluid sample after a time duration X, such as X milliseconds, using the logged pressure and volume data obtained during the time duration X. Calculating the fluid sample compressibility may be performed every X milliseconds using the logged pressure and volume data obtained during the previous X milliseconds. Once the fluid sample compressibility is calculated, it is compared to the reference compressibility. If the calculated compressibility is a factor Y higher than the reference compressibility (i.e., a reference threshold), then the current fluid sample pressure is the estimated bubble point (Block 52).

A detailed explanation of the method 40 and possible variations are discussed next. Gases and liquids have large differences in compressibility at equal temperature and pressure. Hence, the gas bubbles which appear when the bubble point is reached alter the fluid compressibility rapidly and provide an indication of the bubble point.

Decreasing the pressure of the fluid sample from the formation pressure might lead to non-reversible changes to the phase state of the fluid sample. However, increasing the fluid sample pressure above the formation pressure does not change the phase state of the fluid sample. It is important to keep the fluid sample in its original phase state when performing the pressure-volume test so that the determined bubble point is applicable to the fluid in the formation So increasing the pressure before performing the actual PV-test does not alter the phase of the fluid, but gives additional compressibility information and a starting pressure more away from the bubble point. This leads to a longer linear shape of the pressure curve at the beginning of the P-V test thus providing a more accurate reference curve from which to determine the bubble point.

A variable or adaptive pump rate may be used to optimize the usage of available test time and the pump stroke by setting a predetermined pressure decrease rate instead of a predetermined pump rate.

Figure 5:
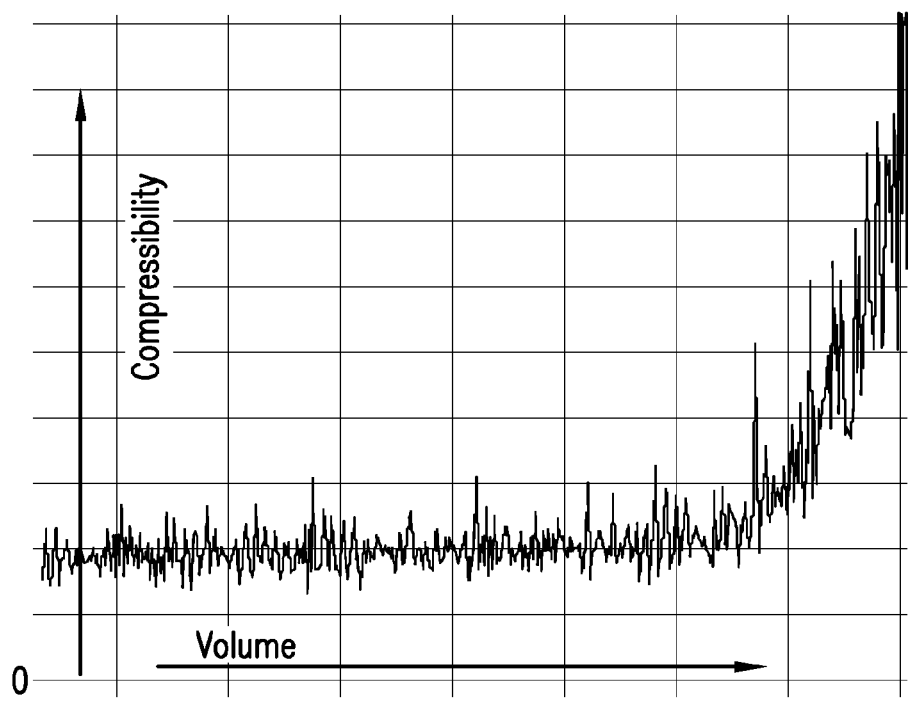
FIG. 5 illustrates one example of compressibility versus volume being calculated using a small data segment size.
Figure 6:
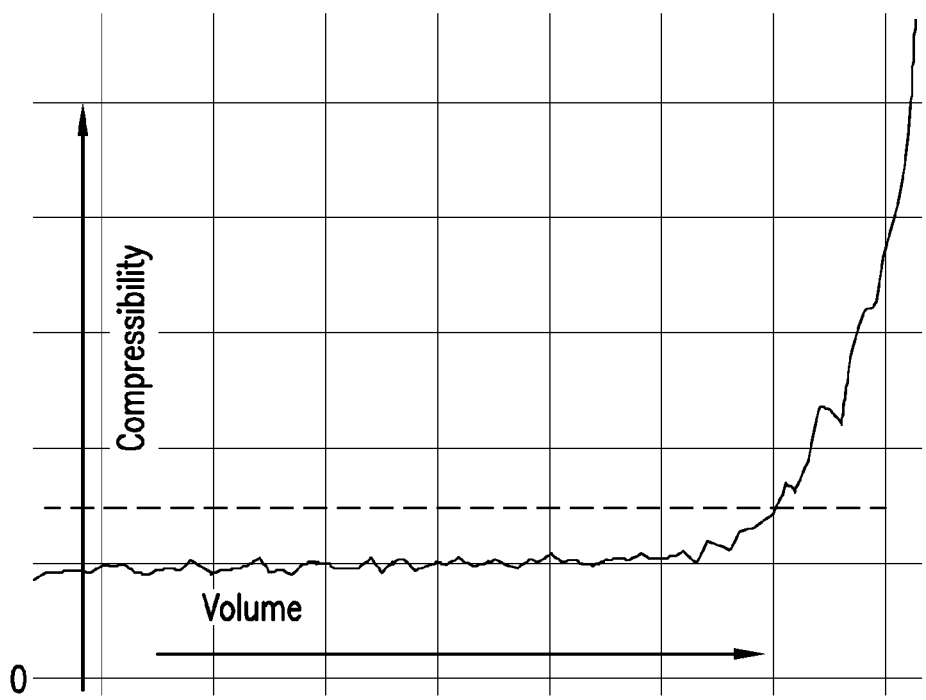
FIG. 6 illustrates one example of compressibility versus volume being calculated using a large data segment size that is larger than the small data segment size.

The segment size or time duration for logging pressure and volume data for the compressibility calculation ("X milliseconds") influences the smoothness of the resulting compressibility and also the response time of the bubble point detection. A large segment size leads to smooth data, but delays the time until the bubble point can be detected (and lead to underestimating the bubble point pressure). FIG. 5 illustrates one example of compressibility versus volume being calculated using a small data segment size, while FIG. 6 illustrates one example of compressibility versus volume being calculated using a large data segment size that is larger than the small data segment size. The curve in FIG. 6 was derived from the same raw data used derive the curve in FIG. 5, thus enabling the two curves to be directly compared.

The reference compressibility is the compressibility of the fluid at the beginning of the P-V test. One way is to determine the reference compressibility is to use the compressibility calculated in block 46 of the method 40 as the reference compressibility. Other variations are possible, such as using compressibility calculated in the first segment(s) of the PV-test, while the fluid sample pressure is still above formation pressure.

The bubble point is detected when the actual compressibility is significantly larger than the reference compressibility. The "significantly larger" is determined by setting a threshold that is scaled to the reference compressibility. A factor Y near 1.5 times the reference compressibility has shown to yield good results with the data presented herein. The horizontal dashed line in FIG. 6 illustrates a possible threshold based on a factor of Y=1.5 times the reference compressibility.

The choice of Y may depend on the noise level of the compressibility data. It should be as small as possible to detect the earliest change in compressibility, but must be high enough not to trigger bubble point detection due to noise. Since noise level is influenced by the choice of X, both parameters may not be independent of each other.

In one or more embodiments, Y may be dynamically derived from the first seconds of the P-V test, when the actual pressure is still above formation pressure. The data acquired during this time shows a certain noise level. Using this noise level and a desired significance level, a threshold for bubble point detection can be calculated. For example, the threshold can be set a certain amount above the noise level or spikes in the noise level to help prevent false bubble point detection.

In one or more embodiments, X may be adjusted dynamically instead of Y to adjust the noise level to a given threshold since X and Y may not be independent of each other.

In one or more embodiments, several results (i.e., bubble point pressure determinations) can be determined using different Y significance values. From the several bubble point determinations, outlying values from an expected trend can be excluded to determine the most accurate or most likely bubble point.

Figure 7:
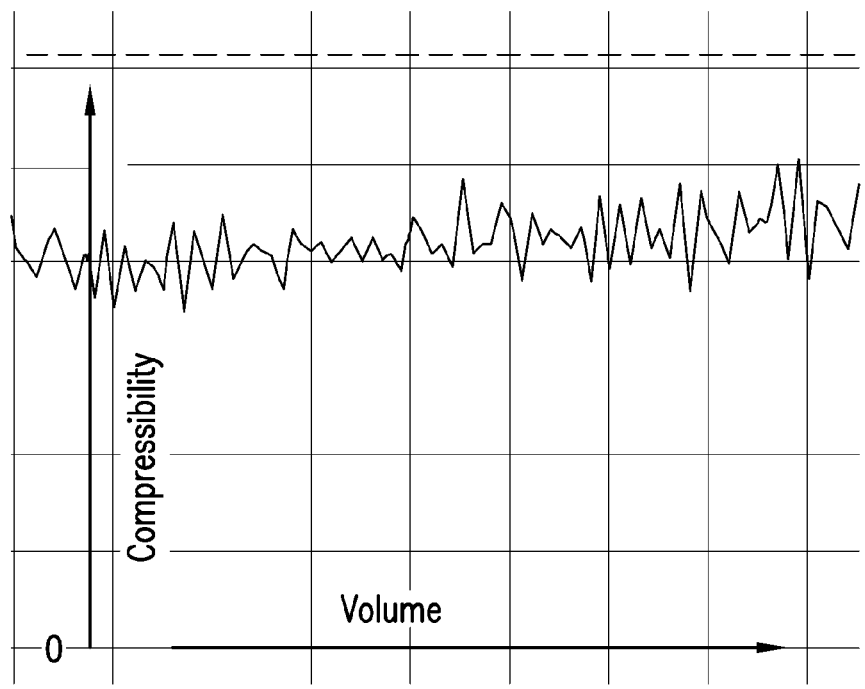
FIG. 7 illustrates one example of compressibility versus volume with a pump stalled without reaching the bubble point.

FIG. 7 illustrates a compressibility curve of a test where the bubble point has not been reached. The compressibility stays nearly constant and the curve never crosses the dashed-line threshold. This data and method indicate that there is no bubble point. In this example, the compressibility curve is derived from a P-V test where the bubble point has not been reached because the pump stalled before reaching the bubble point.

Figure 8:
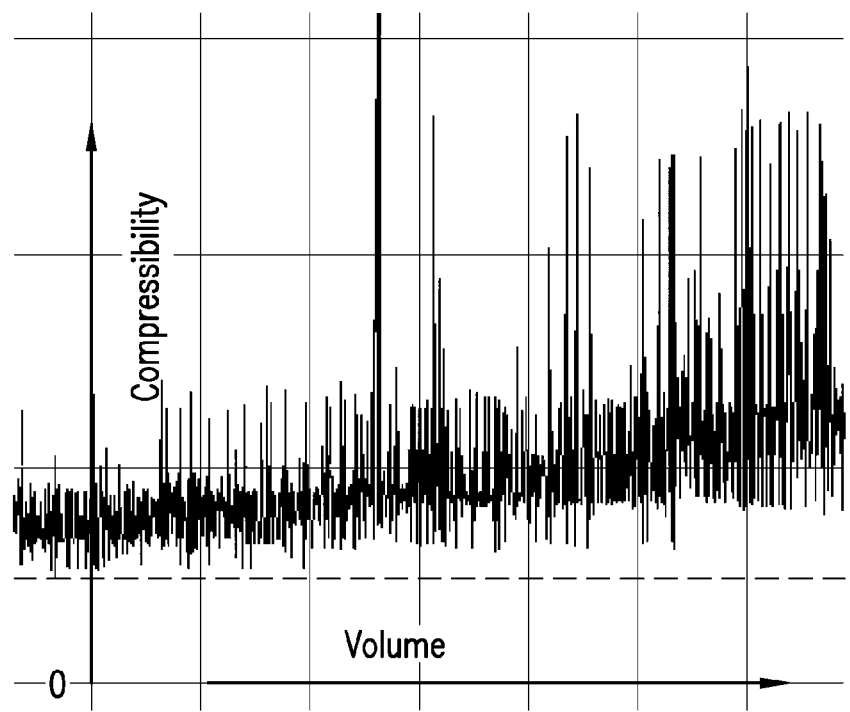
FIG. 8 illustrates one example of compressibility versus volume for a gas.

FIG. 8 illustrates another compressibility curve without detecting a bubble point because the medium being decompressed is already a gas. Hence, data of the type illustrated in FIG. 8, where the compressibility exceeds a gas detection set point, may be used to detect gas in the formation. The gas detection set point may be predetermined or it may be derived from compressibility calculation data such when "spikes" in the calculated compressibility meet or exceed a certain percentage above an average of the data in one or more embodiments.

The reference compressibility can be used to decide if the fluid already contains a gas phase and thus no bubble point should be determined (see block 47 of the method 40). Compressibility of gas and supercritical fluids depends on pressure and temperature.

Using pressure and temperature measurements and maybe additional information about the expected fluid composition, a heuristic compressibility threshold for the reference compressibility can be chosen. If the reference compressibility is already higher than the threshold, no bubble point will be determined.

The order of magnitude of gas compressibility is $1/P$ where P is the pressure of the gas (isothermal bulk modulus of ideal gas equals its pressure). This value can be used as a starting point to derive a compressibility threshold.

The horizontal dashed line in FIG. 8 illustrates a simple example threshold of $0.5*1/P$, where P is starting pressure of the test.

In one or more embodiments, the bubble point is always determined or detected, but the gas detecting threshold is used to calculate a quality indicator indicative of the quality of the result. Higher reference compressibility (above threshold) leads to a lower quality indicator.

It can be appreciated that the apparatus and method disclosed herein offer several advantages over traditional apparatuses and methods for determining the bubble point of formation fluids. For example, traditional analysis of the curvature of a pressure-volume test for local maxima always leads to a determination of a bubble point, even if there is no bubble point in the data. Traditional apparatuses and methods perform a pressure-volume test starting at or below formation pressure. If the bubble point is near formation pressure, the first linear part of the curve might be very short, so the onset of high curvature is hard to determine. Further, traditional apparatuses and methods use a predefined pump speed (i.e., not a variable or adaptive pump speed).

In support of the teachings herein, various analysis components may be used, including a digital and/or an analog system. For example, the downhole electronics 9 or the computer processing system 11 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a bubble point of a fluid in an earth formation penetrated by a borehole, the apparatus comprising:
   a carrier configured to be conveyed through the borehole;
   a probe disposed at the carrier and configured to extend from the carrier and seal to a wall of the borehole;
   a pump in fluid communication with the probe, the pump having a variable volume configured to pump fluid from the earth formation into the volume within the pump;
   a volume sensor configured to sense the volume within the pump;
   a pressure sensor in pressure communication with the fluid in the volume of the pump and configured to sense the pressure of the fluid in the volume in the pump;
   an isolation valve coupled to the probe and configured to isolate a sample of the fluid pumped through the probe, wherein the sample is isolated in the pump; and
   a processor coupled to the volume sensor, the pressure sensor, and a prime mover configured to operate the pump to change the variable volume, the processor being configured to perform a pressure-volume test on the fluid sample, the test comprising:
     increasing the pressure of the fluid sample above formation pressure by decreasing the volume within the pump and logging the pressure and volume of the fluid sample using the pressure sensor and the volume sensor during the decrease in volume of the pump;
     calculating a reference compressibility of the fluid sample;
     decreasing the pressure of the fluid sample and logging the pressure and volume using the pressure sensor and the volume sensor;
     calculating a compressibility of the fluid sample using the logged pressure and volume obtained from during the decreasing;

comparing the calculated compressibility to a threshold; and estimating the bubble point as the current fluid sample pressure when the calculated compressibility first meets or exceeds the threshold factor.

2. The apparatus according to claim 1, further comprising calculating a volume expansion rate using the reference compressibility for decreasing the pressure in order to meet a selected pressure decrease rate.

3. The apparatus according to claim 1, wherein the processor is further configured to determine a formation pressure using the pressure sensor while the isolation valve is open.

4. The apparatus according to claim 1, wherein the processor is further configured to calculate the reference compressibility using measurements obtained from the pressure sensor and the volume sensor during the increasing of the pressure of the fluid sample.

5. The apparatus according to claim 1, wherein the logged pressure for calculating a reference compressibility of the fluid sample is above the formation pressure.

6. The apparatus according to claim 1, wherein the processor is further configured to detect that the fluid sample contains a gas component when the calculated compressibility meets or exceeds a gas detection set point.

7. The apparatus according to claim 1, wherein the carrier comprises a wireline or a drill tubular.

8. The apparatus according to claim 1, wherein the pump is a positive displacement pump comprising a moveable piston coupled to the prime mover, and wherein a position of the piston defines the volume within the pump.

9. The apparatus according to claim 8, wherein the prime mover is configured to move the piston at a rate corresponding to a selected volume expansion rate in order to decrease the pressure of the fluid sample.

10. The apparatus according to claim 1, wherein the processor is coupled to the isolation valve and is further configured to close the isolation valve after the fluid sample is obtained.

11. The apparatus according to claim 10, wherein the processor is further configured to perform the decreasing the pressure, the calculating a compressibility, the comparing, and the estimating while the pressure of the fluid sample is above the formation pressure.

12. The apparatus according to claim 1, wherein the processor is further configured to calculate the compressibility of the fluid after receiving X milliseconds of measurements from the pressure sensor and the volume sensor.

13. The apparatus according to claim 12, wherein the processor is further configured to calculate the compressibility after receiving the next X milliseconds of measurements from the pressure sensor and the volume sensor.

14. A method for estimating a bubble point of a fluid in an earth formation penetrated by a borehole, the method comprising:

conveying a carrier through the borehole;

extracting a sample of fluid from the formation using a probe extending from the carrier to the formation;

closing an isolation valve in fluid communication with the probe in order to isolate the fluid sample from the formation, wherein the sample is isolated in a pump;

increasing the pressure of the fluid sample above formation pressure by decreasing a volume within the pump in fluid communication with the probe and logging the pressure and volume of the fluid sample using a pressure sensor and a volume sensor during the decreasing of the volume within the pump;

calculating a reference compressibility of the fluid sample using a processor;

decreasing the pressure of the fluid sample by increasing the volume within the pump and logging the pressure and volume measured by the pressure sensor and the volume sensor;

calculating a compressibility of the fluid sample using the logged pressure and volume obtained from during the decreasing, the calculating being performed by the processor;

comparing the calculated compressibility to a threshold using the processor; and estimating the bubble point as the current fluid sample pressure when the calculated compressibility first meets or exceeds the threshold.

15. The method according to claim 14, wherein the logged pressure for calculating a reference compressibility of the fluid sample is above the formation pressure.

16. The method according to claim 14, wherein the pump is a positive displacement pump comprising a piston, a position of the piston determining the volume within the pump, and the method further comprises stopping movement of the piston during the increasing the pressure of the fluid sample when an upper pressure limit is reached.

17. The method according to claim 14, wherein in the increasing the pressure of the fluid sample is done slow enough so that the compression of the fluid sample is isothermal.

18. The method according to claim 14, further comprising detecting that a gas is present in the fluid sample when the calculated compressibility meets or exceeds a gas detection set point.

19. The method according to claim 14, further wherein the decreasing the pressure is according to a volume expansion rate calculated using the reference compressibility.

20. The method according to claim 19, further comprising applying a maximum limit and a minimum limit to the volume expansion rate, wherein the volume expansion rate is not to exceed the maximum limit and the minimum limit.

21. The method according to claim 14, wherein the compressibility is calculated after logging pressure and volume measurements for a time duration of X milliseconds.

22. The method according to claim 21, wherein the compressibility is calculated again after the next X milliseconds.

23. The method according to claim 21, further comprising adjusting the time duration to achieve a selected noise level in the calculated compressibility.

24. The method according to claim 21, wherein the threshold is a scale factor of a compressibility curve derived from each calculated compressibility after one or more time durations.

* * * * *